United States Patent
Kaneko et al.

(10) Patent No.: US 6,327,518 B1
(45) Date of Patent: Dec. 4, 2001

(54) OFF-LINE TEACHING APPARATUS

(75) Inventors: Masakatsu Kaneko, Hanno; Shinji Aoki, Sayama, both of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/659,587

(22) Filed: Sep. 11, 2000

Related U.S. Application Data

(62) Division of application No. 09/144,472, filed on Aug. 31, 1998, now Pat. No. 6,226,567.

(30) Foreign Application Priority Data

Sep. 10, 1997 (JP) .................................................. 9-245263

(51) Int. Cl.[7] .................................................. G06F 19/00
(52) U.S. Cl. ..................... 700/245; 700/247; 700/249; 700/253; 318/568.2; 318/568.13; 318/568.15; 318/568.18; 318/568.23; 91/31; 91/42; 219/124.34; 701/2; 701/23
(58) Field of Search ................................. 700/245, 247, 700/249, 253, 255; 901/42, 31, 4, 7, 5; 318/568.13, 568.15, 568.18, 568.2, 568.23; 219/124.34, 124.33, 125; 706/23, 903; 701/2, 23

(56) References Cited

U.S. PATENT DOCUMENTS

| | | | |
|---|---|---|---|
| 4,338,672 | * 7/1982 | Perzley et al. | 700/429 |
| 4,354,246 | 10/1982 | Fujisawa | 708/136 |
| 4,398,720 | 8/1983 | Jones et al. | 463/14 |
| 4,970,672 | 11/1990 | Snodgrass | 708/142 |
| 5,371,836 | * 12/1994 | Mitomi et al. | 700/245 |
| 5,495,090 | * 2/1996 | Mukai et al. | 219/124.34 |
| 5,555,347 | * 9/1996 | Yoneda et al. | 700/247 |
| 5,798,627 | * 8/1998 | Gilliland et al. | 318/568.14 |
| 5,906,761 | * 5/1999 | Gilliland et al. | 219/124.34 |

OTHER PUBLICATIONS

Cook et al., An Intelligent Robotics Simulator, 1994, IEEE., pp. 1793–1800.*
Spong et al., On the Iterative Learning Control Theory for Robotic Manipulators, Feb. 1988, IEEE., Robot Control Dynamics, Motion Planning, and Analysis, pp. 220–228.*
Japanese Patent Abstract of JP 5289736, Nov. 5, 1993 (Matsushita Electric Works, Ltd.).
Japanese Patent Abstract of JP 1269105, Oct. 26, 1989 (Fanuc Ltd.).

* cited by examiner

Primary Examiner—William A. Cuchlinski, Jr.
Assistant Examiner—McDieunel Marc

(57) ABSTRACT

An off-line teaching apparatus includes an operation command-receiving device for receiving an operation command inputted via an input/output port from a key input device or a coordinate input device and successively storing the operation command in a buffer; an operation command-reading device for successively reading the operation command stored in the buffer; an operation command-counting device for counting a number of operation commands stored in the buffer; and a confirmation sound-generating device for generating confirmation sound upon receipt of the operation command by the operation command-receiving device when a counted value obtained by the operation command-counting device is not less than a predetermined number. Accordingly, the operator is informed, in real time, of the fact that the system responds to the input of the operation command from the operator. Thus, it is possible to improve the operability of the off-line teaching.

3 Claims, 13 Drawing Sheets

HISTORICAL TABLE (72)

| MAGNIFICATION RATIO |
| --- |
| DISPLAY ORIENTATION (FOR EXAMPLE, FRONT, BACK, AND SIDE) |
| DISPLAY RANGE CONCERNING FIRST AXIS (COORDINATE RANGE) |
| DISPLAY RANGE CONCERNING SECOND AXIS (COORDINATE RANGE) |
| ⎱ |
| DISPLAY RANGE CONCERNING SIXTH AXIS (COORDINATE RANGE) |

ACTION ATTRIBUTE TABLE (74)

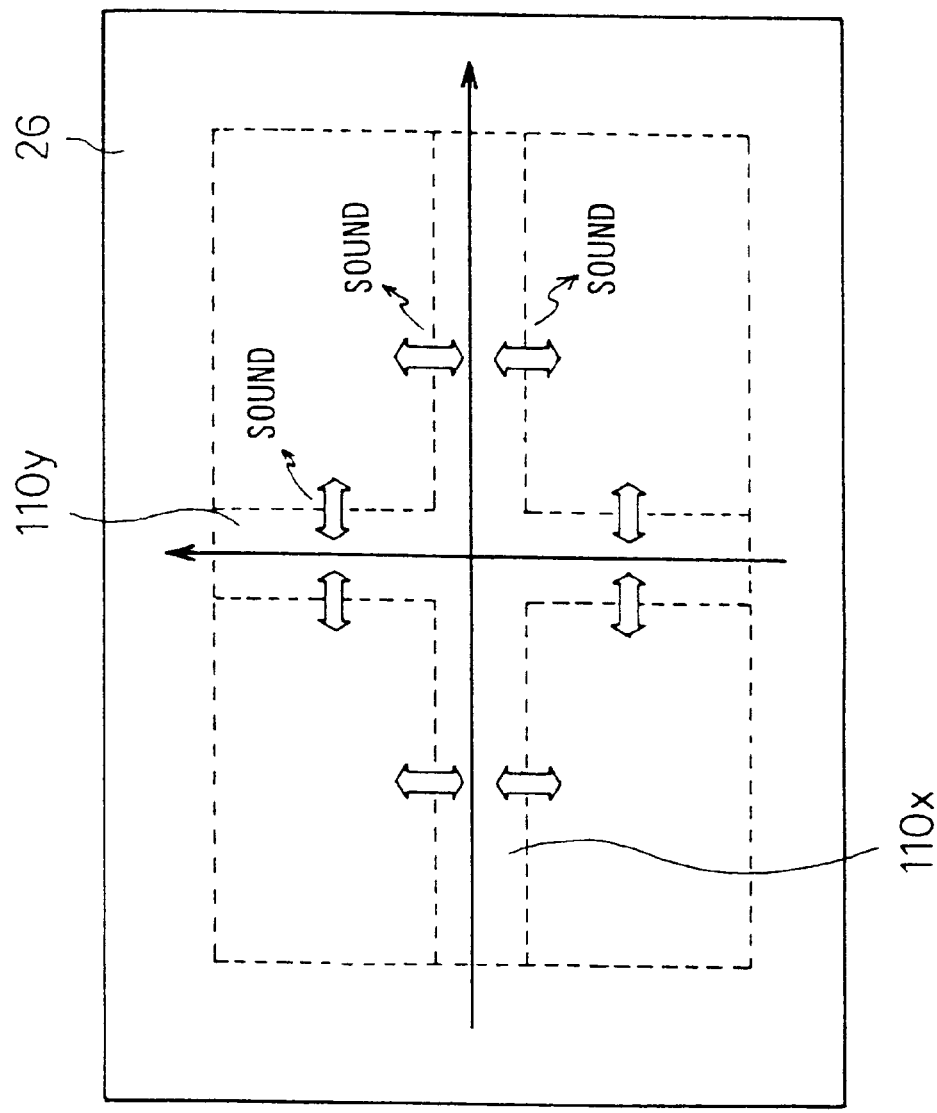
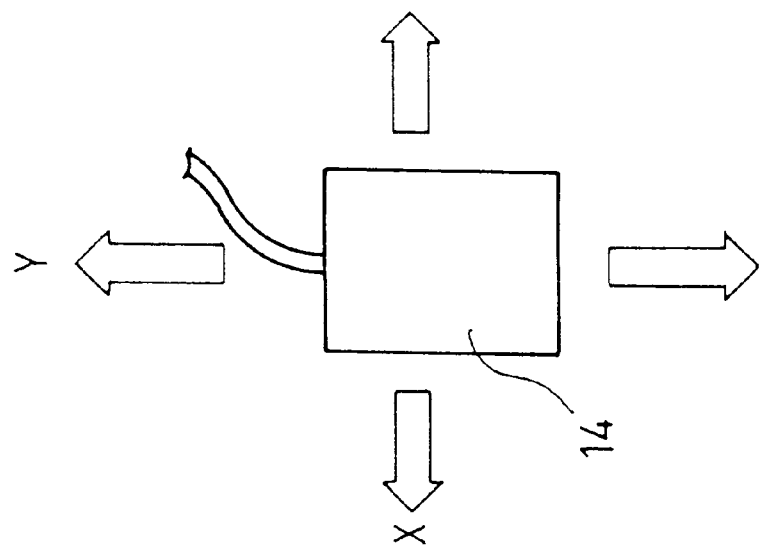
FIG. 14A
FIG. 14B

OFF-LINE TEACHING APPARATUS

This application is a division of Ser. No. 09/144,472 filed Aug. 31, 1998. Now U.S. Pat. No. 6,226,567 May 1, 2001.

BACKGROUND OF THE INVENTION

1. Field of the Invention

The present invention relates to an off-line teaching apparatus which is used when a robot model displayed on a monitor is operated by using a keyboard and/or a pointing device (for example, a mouse) and which makes it possible to optimally express the action in conformity with a display form of the robot model.

2. Description of the Related Art

Recently, in order to apply a robot to a variety of workings, in general, a variety of tools are attached to a face-plate of a robot arm to allow the robot to perform the workings.

The programming for the robot includes the on-line programming (on-line teaching) and the off-line programming (off-line teaching). In the case of the on-line teaching, the arm of the robot is moved to pass through necessary points or along a locus by using a push button, an operation button, an operation handle, and a joystick so that the control unit is allowed to store the points or the locus.

When the robot is operated at the driving stage, the robot reproduces and executes the stored movement.

In the off-line teaching, the operation procedure is programmed without directly using the robot. In the case of the off-line teaching, the software is programmed such that the movement of each joint is calculated in order to move the end effector to a necessary position in a necessary direction.

The movement of the robot can be displayed in animation on a graphic terminal connected to a computer, by adding a graphic function to the system which is used to execute the off-line teaching. The off-line teaching based on the use of the graphic has the following advantages.

(1) When the operation program is debugged by using the graphic, it is possible to reduce the time and the labor as compared with a case in which an actual robot is used.

(2) It is possible for the user to begin programming before the robot is introduced. Further, various types of robots can be tested on the monitor screen to select a type of machine which is most suitable for the plan.

(3) It is possible to avoid confliction in view of surrounding situations when the movement of the robot is simulated.

(4) It is possible to use a common database of CAD/CAM. For example, when a computer for CAD/CAM stores a body shape of an automobile, the designer can designate the place to be subjected to spot welding.

In the off-line teaching system having the graphic function, a robot model is displayed on a monitor screen, and the robot model is allowed to act in accordance with an operation command given by the operator.

In such a system, it takes a long time to process the program which is executed to display the robot model in animation. Therefore, the operation command, which is inputted by the operator one after another, cannot be processed in real time. It is assumed, for example, that a pointing device such as a mouse is operated in order to move the robot model. When the load is small, then the system usually makes a sensitive response to the movement of the pointing device, and the robot model on the screen is also moved in accordance with the amount of operation of the pointing device. However, when the robot model has a complicated structure, and it is constructed by a variety of drawing lines, then the capacity of display data is large. Therefore, it is impossible to make the sensitive response to the movement of the pointing device, and a considerably delay occurs in the response.

In such a case, the operator misunderstands that the operation command is not inputted into the system. As a result, the operator inputs the same operation command a number of times. Therefore, an inconvenience arises in that it is necessary to wait for the processing performed by the system to that extend (in a degree corresponding to the vain input).

In the conventional technique, the amount of action of the robot model, which is given in response to the amount of operation of the pointing device, is constant for the case in which the robot model is displayed with magnification and for the case in which the robot model is displayed with reduction. The display with magnification is made in accordance with a request that the robot model is allowed to make fine movement. However, actually, the robot model moves in a certain constant amount of action, in the same manner as in the display with reduction. Therefore, it is impossible to allow the robot model to perform, for example, an accurate and fine adjusting action.

On the other hand, for example, a robot having three axes is assumed, in which, for example, only the first axis (X axis direction) is subjected to movement by using a pointing device such as a mouse. When the pointing device is operated by the human hand, the arm is moved rightward and leftward about a supporting point of the elbow. Therefore, the pointing device is moved along a line depicted as a circular arc. In such a situation, the second axis in the Y axis direction is also subjected to movement in addition to the first axis, and it is impossible to allow the robot model to perform the desired operation (operation to make movement only for the first axis). It is feared, for example, that such a situation may obstruct the work to confirm the off-line teaching performed for the robot model.

SUMMARY OF THE INVENTION

The present invention has been made taking the foregoing problems into consideration, an object of which is to provide an off-line teaching apparatus which makes it possible to inform, in real time, an operator of the fact that the system responds to an input of an operation command given by the operator, and which makes it possible to improve the operability of the off-line teaching.

Another object of the present invention is to provide an off-line teaching apparatus which makes it possible to process an inputted operation command in conformity with a display form (for example, with magnification, with reduction, as viewed from the front side, and as viewed from the back side) of a robot model, and which makes it possible to improve the operability of the off-line teaching.

Still another object of the present invention is to provide an off-line teaching apparatus which makes it possible to allow a robot model to act for only a specified axis by using a pointing device, and which makes it possible to improve the operability of the off-line teaching.

According to the present invention, there is provided an off-line teaching apparatus for allowing a robot model displayed on a monitor to act on a screen on the basis of an operation command supplied from an input device, wherein a sound for informing an input is generated at a point of time at which the input of the operation command from the input device is sensed.

According to the present invention, it is possible to inform, in real time, the operator of the fact that the system responds to the input of the operation command from the operator.

It is preferable for the off-line teaching apparatus constructed as described above that the sound for informing the input is generated at a point of time at which the operation command inputted at present is sensed during the action of the robot model effected on the basis of the operation command inputted previously.

When the processing load is light, the system quickly responds to the operation performed by the operator. Therefore, any sound generated in such a situation is merely a nuisance. For this reason, it is desirable that the sound is generated when the load is heavy, namely when the system fails to make quick response to the operation performed by the operator.

In a preferred embodiment, it is preferable that the sound is generated at a point of time at which the operation command from the input device is inputted into a buffer. Alternatively, it is preferable that the sound is generated at a point of time at which an interrupt indicating input of the operation command from the input device is generated. The generation of the sound at the foregoing points of time makes it possible to allow the operator to recognize that the system responds to the input given by the operator in real time.

In order to achieve the off-line teaching apparatus constructed as described above, the apparatus may further comprise an operation command-receiving means for receiving the operation command from the input device and storing the operation command in a buffer, an operation command-counting means for counting a number of operation commands stored in the buffer, and a sound-generating means for generating the sound upon receipt of the operation command by the operation command-receiving means when a counted value obtained by the operation command-counting means is not less than a predetermined number.

Accordingly, at first, the operation commands from the input device are successively received, and they are stored in the buffer, by the aid of the operation command-receiving means. The operation command-counting means is used to count the number of the operation commands stored in the buffer. The counting process is performed, for example, such that the value is updated by +1 every time when the operation command is stored in the buffer, while the value is updated by −1 every time when the operation command is taken out of the buffer. Accordingly, it is possible to count the number of operation commands stored in the buffer. When the heavy load process is executed by using the system, the number of operation commands stored in the buffer is increased. Therefore, when the counted value obtained by the operation command-counting means is not less than the predetermined number, then it is judged that the heavy load process is executed, and the sound-generating means generates the sound when the operation command is received by the operation command-receiving means.

In another aspect, the present invention lies in an off-line teaching apparatus for allowing a robot model displayed on a monitor to act on a screen on the basis of an operation command supplied from an input device, wherein the operation command from the input device is interpreted depending on an operation point and a display form of the robot model to make a response.

According to the present invention, the inputted operation command can be processed depending on the operation point and the display form (for example, with magnification, with reduction, as viewed from the front side, and as viewed from the back side) of the robot model. Thus, it is possible to improve the operability of the off-line teaching.

In order to achieve the on-line teaching apparatus constructed as described above, the apparatus further comprises an operation command-receiving means for receiving the operation command from the input device, an action information-extracting means for deducing an operation point and a direction of action from the received operation command, a display form-reading means for reading a display form of the robot model from display orientation information on the robot model, an action attribute table registered with attributes of action corresponding to the display form and the operation point, and an action attribute-reading means for reading an attribute of action corresponding to the operation command from the action attribute table on the basis of an extracted operation point and read display form information, wherein the operation command is processed depending on the read attribute of action.

Accordingly, at first, the operation commands from the input device are successively received by the aid of the operation command-receiving means. The operation point and the direction of action are deduced from each of the received operation commands by the aid of the action information-extracting means. During this process, the information on the display form of the robot model is read from the information on the display orientation information of the robot model by the aid of the display form-reading means.

The attribute of action corresponding to the operation command is read from the action attribute table on the basis of the extracted operation point and the read display form information by the aid of the action attribute-reading means. The operation command is processed in accordance with the read attribute of action.

The action attribute table has a file structure in which the attribute of action can be accessed by using the operation point and the display form information as indexes.

For example, it is assumed that the operation point lies in the first axis, the information of "normal direction" is registered for the display form information which represents the display as viewed from the front side, and the information of "opposite direction" is registered for the display form information which represents the display as viewed from the back side. If the display of the robot model on the monitor is at the front side, and there is an input of the operation command indicating, for example, rightward movement with respect to the point of the first axis, then the robot model is moved in the normal direction, i.e., the robot model is moved rightward.

If the display of the robot model on the monitor is at the back side, and there is an input of the operation command indicating, for example, rightward movement with respect to the point of the first axis, then the robot model is moved in the opposite direction, i.e., the robot model is moved leftward. Similar action is also made for the rotational action.

In still another aspect, the present invention lies in an off-line teaching apparatus for allowing a robot model displayed on a monitor to act on a screen on the basis of an operation command supplied from an input device, wherein when a coordinate input device as one type of the input device is operated along a direction of movement of a certain joint of the robot model, if movement of the coordinate input device involves fluctuation in a degree of being included in a previously set insensitive zone in which a direction perpendicular to the direction of movement is its widthwise direction, then only movement based on the certain joint of the robot model is permitted.

According to the present invention, only the specified axis is allowed to make action for the robot model by using the coordinate input device. Thus, it is possible to improve the operability of the off-line teaching. In order to achieve the off-line teaching apparatus constructed as described above, the apparatus may further comprise a coordinate-reading means for reading inputted coordinate data from the coordinate input device with a predetermined time width, a joint-specifying means for specifying the joint of the robot model on the basis of coordinate data inputted at an initial stage, an insensitive zone-setting means for setting an extending direction and a width of the insensitive zone on the basis of the specified joint, a judging means for judging whether or not the inputted coordinate data is within a range of the preset insensitive zone, and a display-regulating means for permitting only movement of the joint specified by the joint-specifying means if a result of judgement obtained by the judging means is an affirmative judgement.

Accordingly, at first, the coordinate-reading means is used to read, with the predetermined time width, the inputted coordinate data from the coordinate input device. The joint of the robot model is specified by the aid of the joint-specifying means on the basis of the coordinate data inputted at the initial stage. Further, the insensitive zone-setting means is used to preset the extending direction and the width of the insensitive zone. The inputted coordinate data, which is successively read, is subjected to the judgement by the judging means to judge whether or not the inputted coordinate data is within the preset range of the insensitive zone. If it is judged that the inputted coordinate data is within the range of the insensitive zone, the display-regulating means is used to perform only the movement of the joint specified by the joint-specifying means.

If the inputted coordinate data exceeds the range of the insensitive zone, ordinary display is made corresponding to the coordinate data.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14A illustrates a state in which insensitive zones are set in the X direction and in the Y direction on a monitor respectively; and FIG. 14B illustrates a state in which a coordinate input device is moved in the X direction and in the Y direction.

DESCRIPTION OF THE PREFERRED EMBODIMENTS

Illustrative embodiments of the off-line teaching apparatus according to the present invention will be explained below with reference to FIGS. 1 to 14B.

Figure 1:
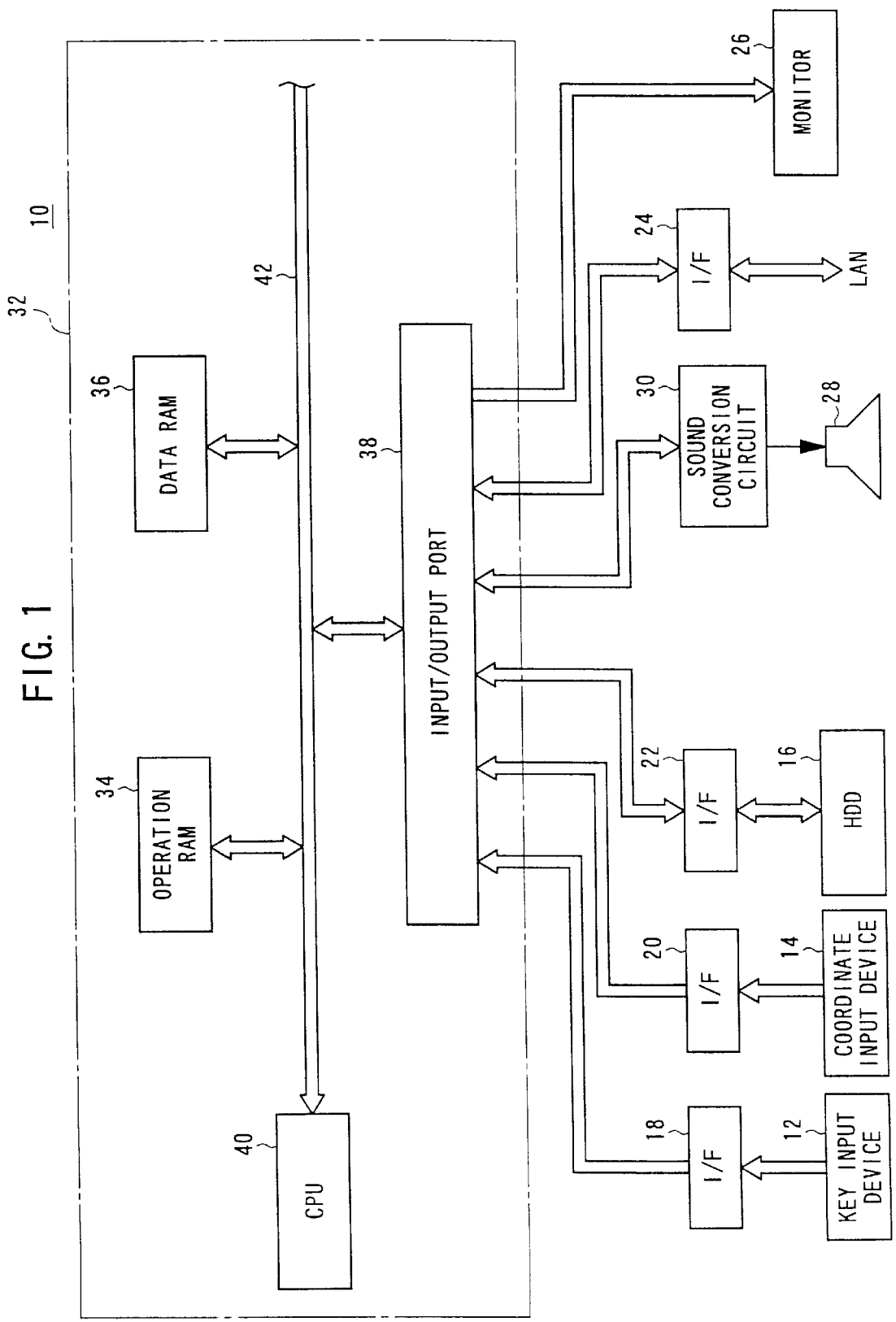
FIG. 1 shows a block diagram illustrating an arrangement of an off-line teaching apparatus according to an embodiment of the present invention.

As shown in FIG. 1, an off-line teaching apparatus 10 according to the embodiment of the present invention comprises a key input device 12 such as a keyboard, a coordinate input device 14 (pointing device) such as a mouse and a joystick, and a hard disk drive (HDD) 16 which are connected via interface (simply referred to as "I/F") circuits 18, 20, 22 respectively. The off-line teaching apparatus 10 is further connected with LAN to be used for delivering, for example, teaching data with respect to other off-line teaching apparatuses via an I/F circuit 24. The off-line teaching apparatus 10 further comprises a monitor 24 for displaying the teaching data incorporated via LAN and the teaching data prepared by using the off-line teaching apparatus 10, and a sound conversion circuit 30 for D/A-converting sound-generating data from the off-line teaching apparatus 10 so that the D/A-converted data is power-amplified and outputted to a speaker 28.

The off-line teaching apparatus 10 has a control system 32 which comprises an operation RAM 34 for executing various programs (for example, teaching processing programs), a data RAM 36 for storing, for example, data supplied from external devices (for example, LAN, coordinate input device 14, HDD 16) and data subjected to data processing based on various programs, an input/output port 38 for inputting/outputting data with respect to the external devices, and CPU (control unit and logical operation unit) 40 for controlling the various types of circuits.

The various types of circuits are subjected to data delivery between the respective circuits via a data bus 42 led from CPU 40, and they are controlled by CPU 40 respectively via an address bus and a control bus (both are not shown) led from CPU 40.

The off-line teaching apparatus 10 according to the embodiment of the present invention has three functions in order to improve the operability.

Figure 3:
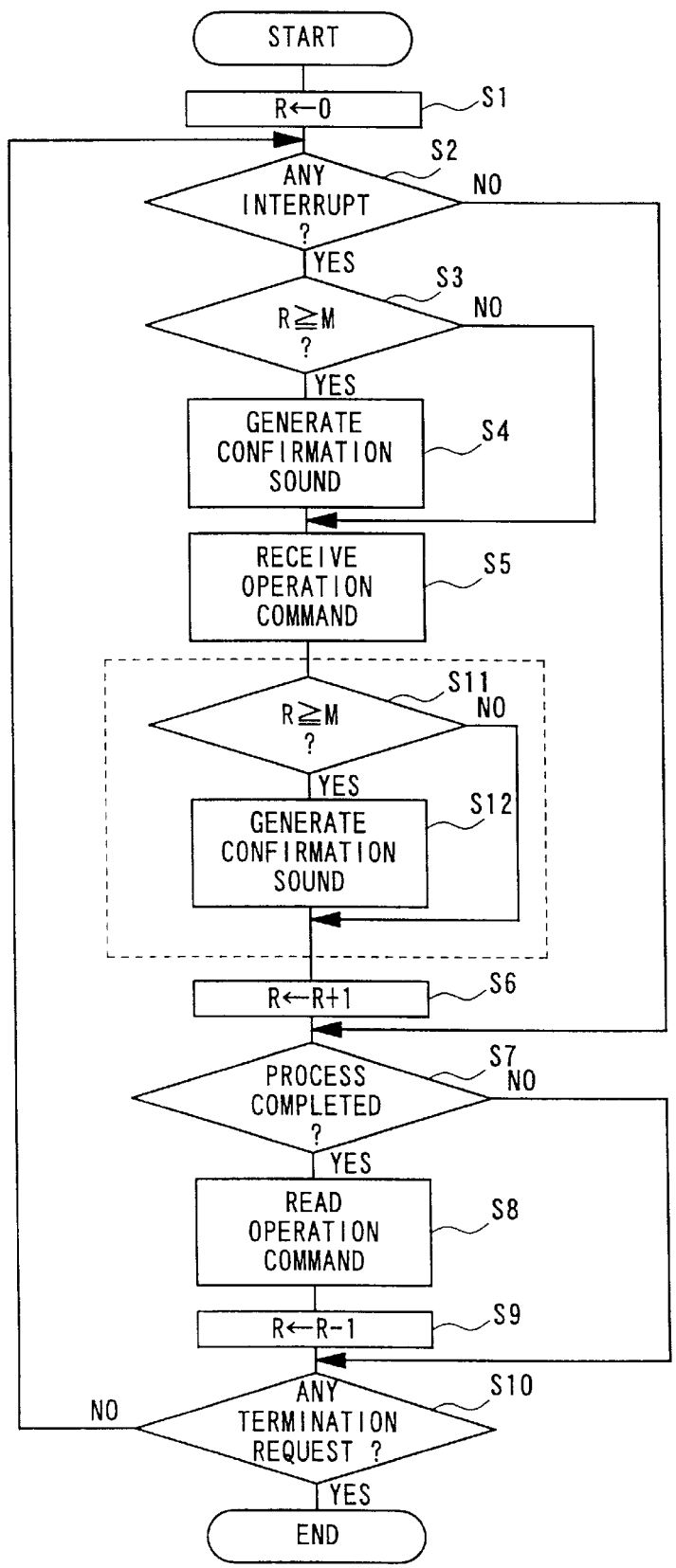
FIG. 3 shows a flow chart illustrating a processing action of the operation command-processing means.
Figure 4:
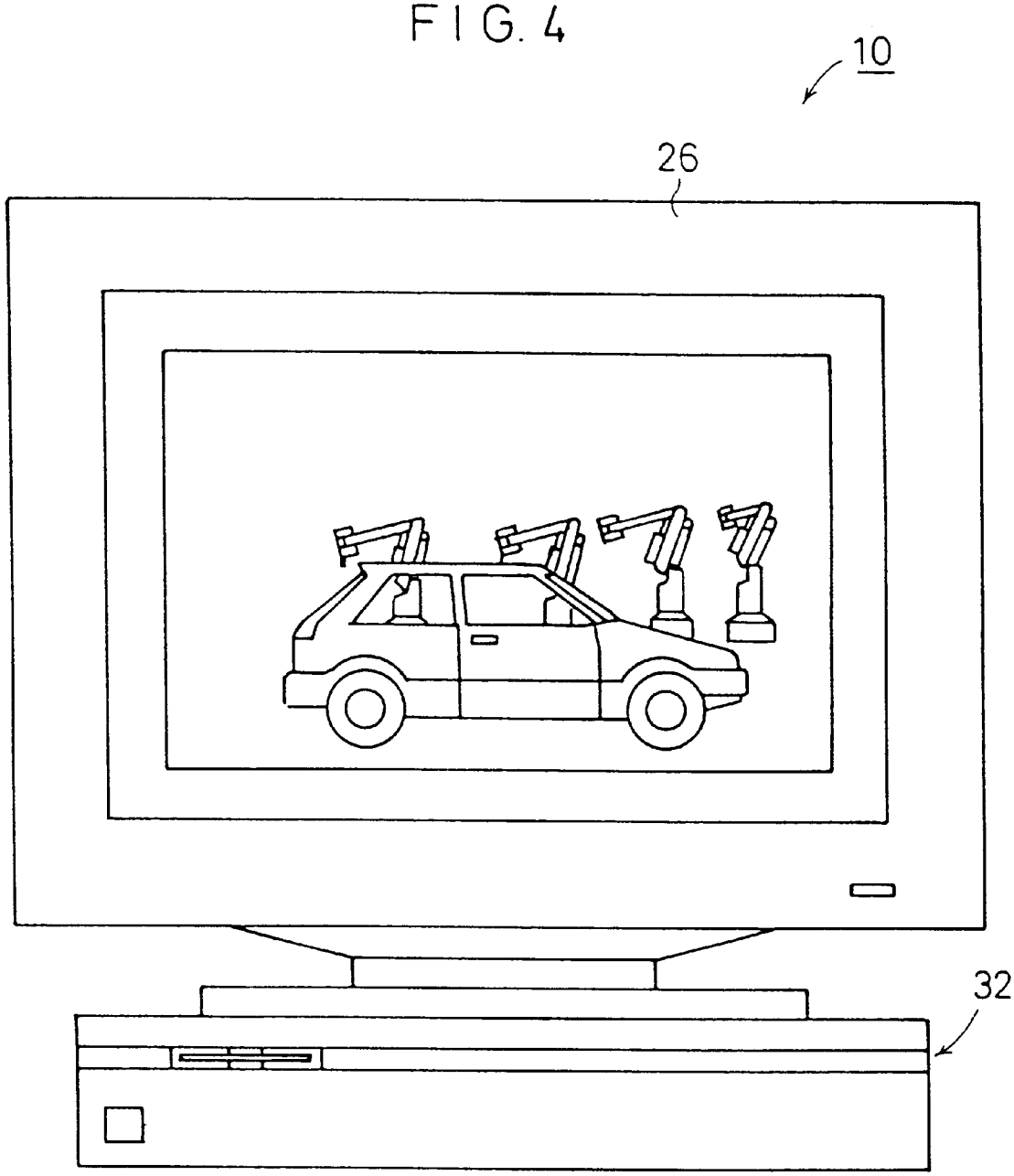
FIG. 4 illustrates an example of display of an image including a large capacity of display data on a monitor.

At first, the first function will be explained with reference to FIGS. 2 to 4. The first function serves to inform, in real time, the operator of the fact that the system responds to the input of the operation command given by the operator so that the operability of the off-line teaching is improved.

The first function is achieved by executing an operation command-processing means (operation command-processing program) 50.

Figure 2:
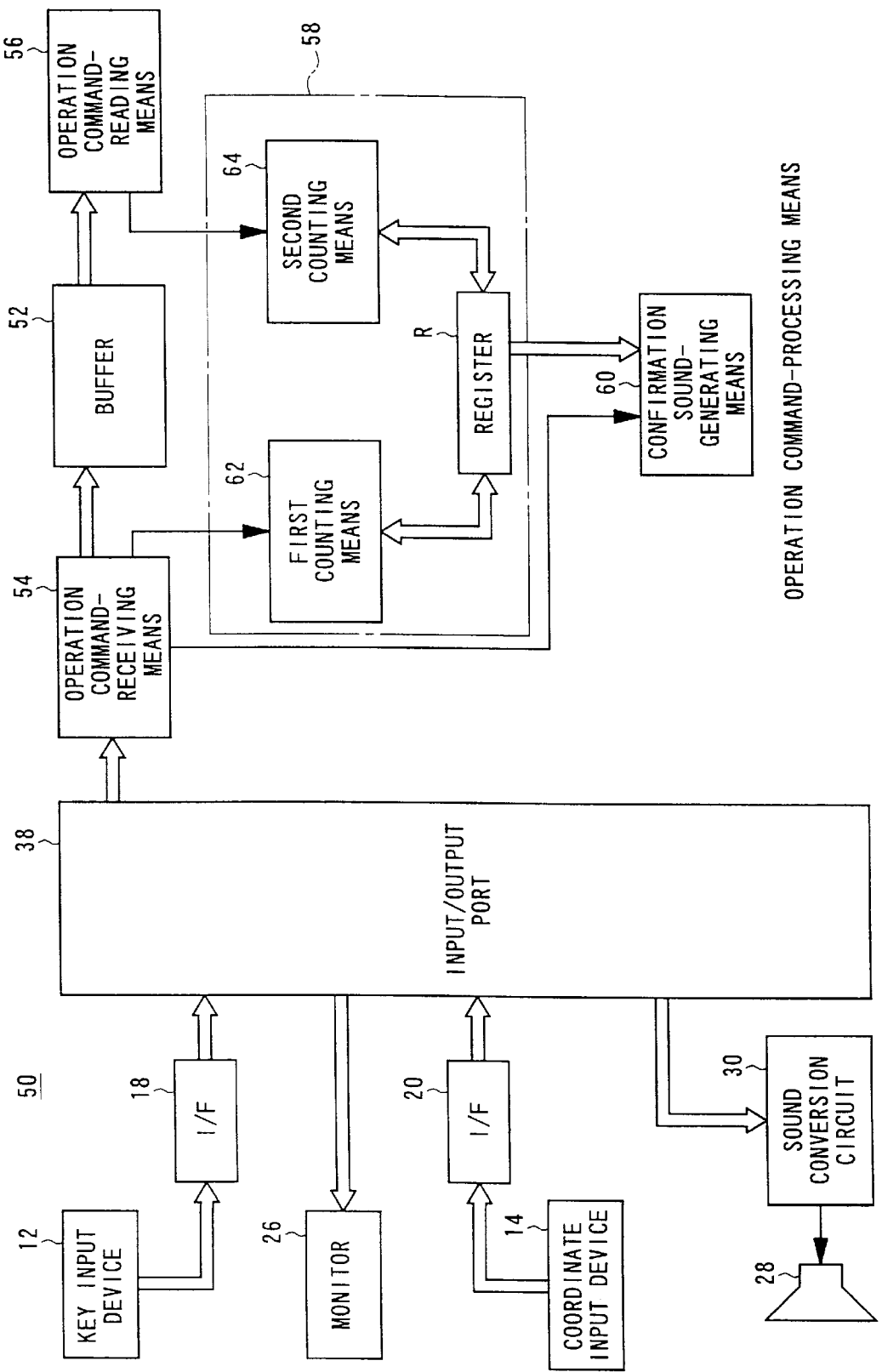
FIG. 2 shows a functional block diagram illustrating an arrangement of an operation command-processing means for achieving a first function.

As shown in FIG. 2, the operation command-processing means 50 comprises an operation command-receiving means 54 for receiving an operation command inputted via the input/output port 38 from the key input device 12 and/or the coordinate input device 14 and successively storing the operation command in a buffer 52, an operation command-reading means 56 for successively reading the operation command stored in the buffer 52, an operation command-counting means 58 for counting the number of operation commands stored in the buffer 52, and a confirmation sound-generating means 60 for generating a confirmation sound when the operation command is received by the operation command-receiving means 54 if the counted value obtained by the operation command-counting means 58 is not less than a predetermined number.

The operation command-counting means 58 has a first updating means 62 for updating the value in a register R by +1 every time when the operation command is stored in the buffer 52, and a second updating means 64 for updating the value by −1 every time when the operation command is taken out of the buffer 52. The value in the register R indicates the number of operation commands stored in the buffer 52.

The buffer 52 is constructed such that the operation command can be successively accessed in accordance with the FIFO system. The operation command is written into the buffer 52 by means of the operation command-receiving means 54. The operation command is read from the buffer 52 by means of the operation command-reading means 56.

Next, the processing operation performed by the operation command-processing means 50 will be explained with reference to a flow chart shown in FIG. 3.

At first, in a step S1, an initial value "0" is stored in the register R to initialize the register R.

Next, in a step S2, the operation command-receiving means 54 is used to judge whether or not there is any input interrupt of the operation command. When the operation command is inputted by the operator by operating the key input device 12 or the coordinate input device 14, the input interrupt is generated. In this case, the routine proceeds to the next step S3 to judge whether or not the value in the register R is not less than a predetermined value M (for example, 10) by the aid of the confirmation sound-generating means 60.

If the value in the register R is not less than the predetermined value M, the routine proceeds to the next step S4 so that the sound data to generate the beep sound is outputted to the speaker 28 by the aid of the confirmation sound-generating means 60. The sound data is converted into an analog sound signal by the sound conversion circuit 30 disposed at the intermediate position. The converted analog sound signal is supplied to the speaker 28. Thus, the beep sound is outputted from the speaker 28. The generation of the beep sound enables the operator to recognize that the operation command has been certainly inputted.

At the stage at which the processing in the step S4 is completed, or if it is judged in the step S3 that the value in the register R is less than the predetermined value M, the routine proceeds to a step S5 to receive the inputted operation command by the aid of the operation command-receiving means 54 so that the operation command is stored in the buffer 52.

Next, in a step S6, the value in the register R is updated by +1 by the aid of the first updating means 62 of the operation command-counting means 58.

At the stage at which the processing in the step S6 is completed, or if it is judged in the step S2 that there is no input interrupt of the operation command, the routine proceeds to a step S7 to judge whether or not the processing for the previously read operation command is completed by the aid of the operation command-reading means 56.

If a response signal, which indicates the completion of processing, is inputted, for example, from the controller for the monitor 26 or the controller for HDD 16, the routine proceeds to the next step S8 to read the next operation command from the buffer 52 by the aid of the operation command-reading means 56 so that the operation command is sent to another processing system. The reading cycle for the operation command in the step S8 is prescribed to be, for example, 1 system time (about 100 ms) when the processing performed by CPU 40 bears a relatively light load. Therefore, when a standard robot model is displayed, the coordinate data from the coordinate input device 14 is read at a time width of about 100 ms, as estimated for the operation of the coordinate input device 14.

Next, in a step S9, the value in the register R is updated by −1 by the aid of the second updating means 64 of the operation command-counting means 58.

At the stage at which the processing in the step S9 is completed, or if it is judged in the step S7 that the processing is not completed, the routine proceeds to a step S10 to judge whether or not there is any program termination request. This judgement is made depending on whether or not there is any occurrence of termination request interrupt such as power source OFF.

If the termination request is not given in the step S10, the routine returns to the step S2 to perform the processing concerning the input of the next operation command. If the termination request is given, the operation command-processing program 50 comes to an end.

It is now assumed that the coordinate input device 14 such as a mouse is operated in order to put the robot model into action. When the load is small, then the system usually responds to the movement of the coordinate input device 14 in a sensitive manner, and the robot model on the screen is also moved in accordance with the amount of operation of the coordinate input device 14. However, as shown in FIG. 4, when four robot models and an automobile are displayed, and the capacity of the display data is large, then the system cannot respond to the movement of the coordinate input device 14 in a sensitive manner, and a considerable delay occurs in response.

In such a situation, when the key input or the instruction operation is performed by the operator, the response to the operation is not made quickly. Therefore, the operator misunderstands that the operation command is not inputted into the system, and the operator inputs the same operation command a number of times. As a result, an inconvenience arises in that the operator must wait for the processing performed by the system, to an extent corresponding thereto (in a degree corresponding to the vain inputs).

However, according to the first function of the off-line teaching apparatus 10 concerning the embodiment of the present invention, the confirmation sound is generated to inform the operator of the input of the operation command at the point of time at which the input of the operation command from the key input device 12 or the coordinate input device 14 is sensed. Therefore, it is possible to inform the operator of the fact that the system responds to the input of the operation command from the operator in real time. This results in successful proposal to allow the operator to suppress any vain input. Thus, the present invention is advantageous to improve the operability of the off-line teaching apparatus 10.

Especially, in the embodiment of the present invention, the confirmation sound is generated if the value in the register R is not less than the predetermined value in the step S3 and in the step S4. Therefore, the confirmation sound is generated at the point of time at which the operation command is newly inputted during the period in which the processing for the robot model is successively performed.

In general, when the load on the processing is light, CPU 40 quickly responds to the operation of the operator. Therefore, the generation of the confirmation sound is merely a nuisance in such a case. However, in the embodiment of the present invention, the confirmation sound is generated when the load is heavy, namely when the system cannot responds to the operation of the operator quickly. Therefore, the operator can recognize the input of the operation command in real time even when the processing on the display is late. Thus, it is possible to effectively avoid the vain input.

In the embodiment described above, the process for judging the value in the register R and the predetermined value M by using the confirmation sound-generating means 60 (see the step S3), and the process for generating the confirmation sound (see the step S4) are performed at the point of time of occurrence of the interrupt which indicates the fact that the operation command is inputted from the key input device 12 or the coordinate input device 14. Alternatively, as shown in a step S11 and a step S12 depicted in a frame drawn by two-dot chain lines, the judging process and the process for generating the confirmation sound may be performed at a point of time at which the inputted operation command is incorporated into the buffer 52.

Next, the second function will be explained with reference to FIGS. 5 to 11. The second function makes it possible to process the inputted operation command in conformity with the display form of the robot model (for example, with magnification, with reduction, as viewed from the front side, and as viewed from the back side) in order to improve the operability of the off-line teaching.

Figure 10:
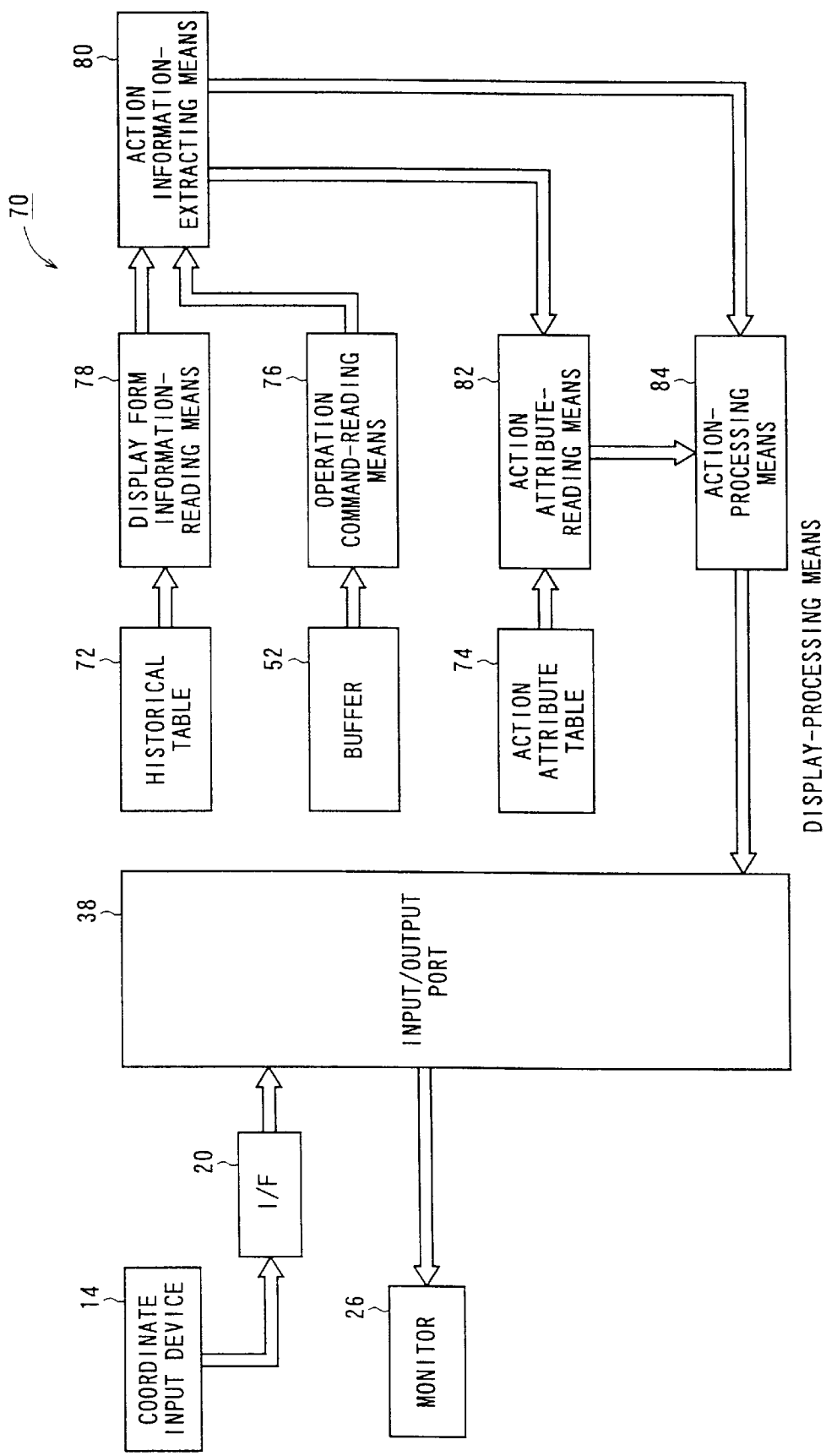
FIG. 10 shows a functional block diagram illustrating an arrangement of a display-processing means for achieving a second function.

The second function is achieved by executing a display-processing means (display-processing program, see FIG. 10). The display-processing means 70 uses a historical table 72 and an action attribute table 74.

Figures 5, 6:
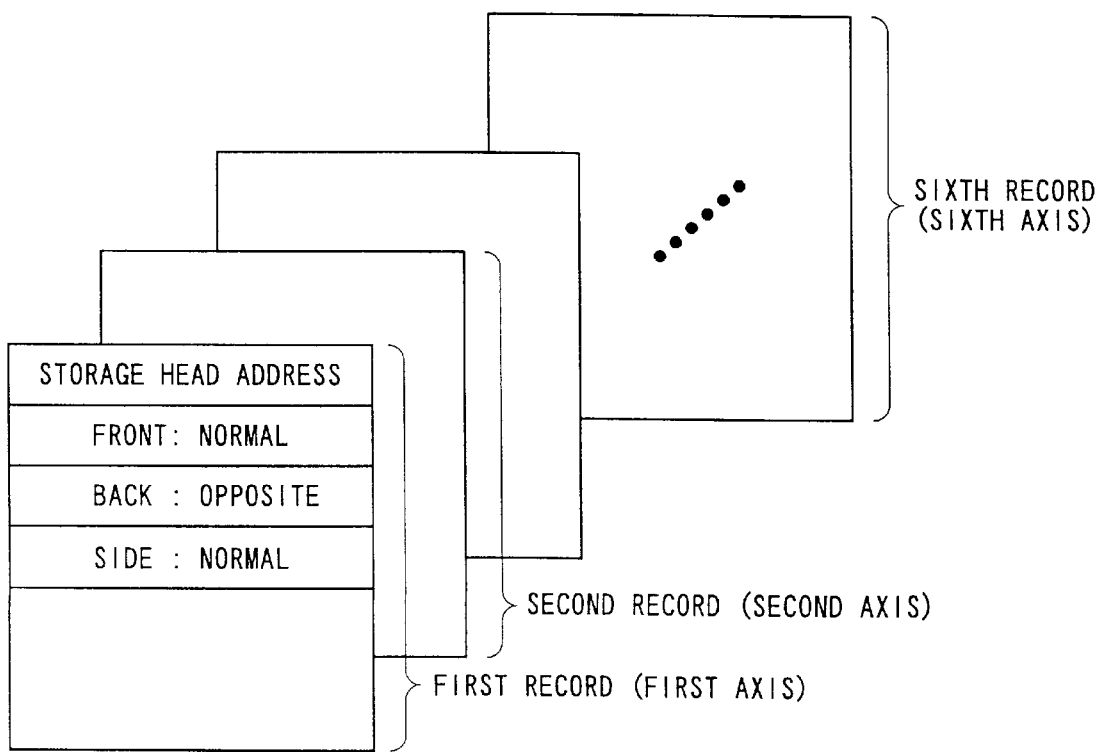
FIG. 5 illustrates the contents of a historical table.
FIG. 6 illustrates the contents of an action attribute table.

As shown in FIG. 5, the historical table 72 is prepared to register, for example, a magnification ratio, a display orientation, and display ranges concerning first to sixth axes (coordinate ranges for the respective axes) of the robot model displayed on the monitor 26. The historical table 72 is updated every time when the display processing is performed on the monitor 26. The display orientation refers to the angle of view as viewed by the operator, and it refers to, for example, the front, the back, and the side.

As shown in FIG. 6, the action attribute table 74 includes a plurality of records corresponding to operation points (for example, first and second axes). Those registered in each of the records include a storage head address for information on the magnification/reduction characteristic curve, and respective display attributes concerning the display orientation (for example, the front, the back, and the side).

Figure 7:
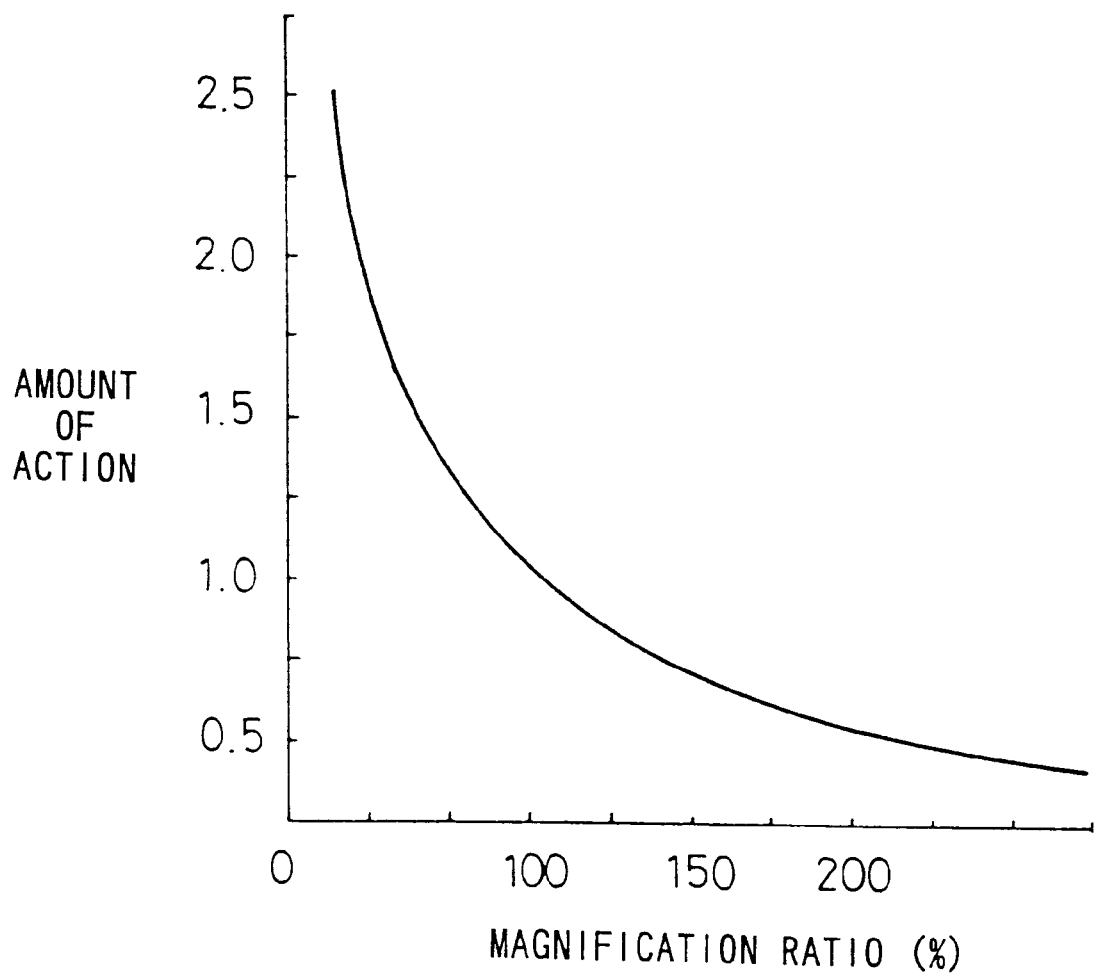
FIG. 7 shows a characteristic curve illustrating the change in amount of action with respect to the magnification ratio.

As shown in FIG. 7, for example, the information on the magnification/reduction characteristic curve refers to a characteristic curve in which the change in amount of action with respect to the magnification ratio approximately has the inversely proportional relationship, indicating that the larger the magnification ratio of the displayed robot model is, the smaller the amount of action of the operation point (for example, the first and second axes) is, based on the use of a mouse or the like.

Figure 8A:
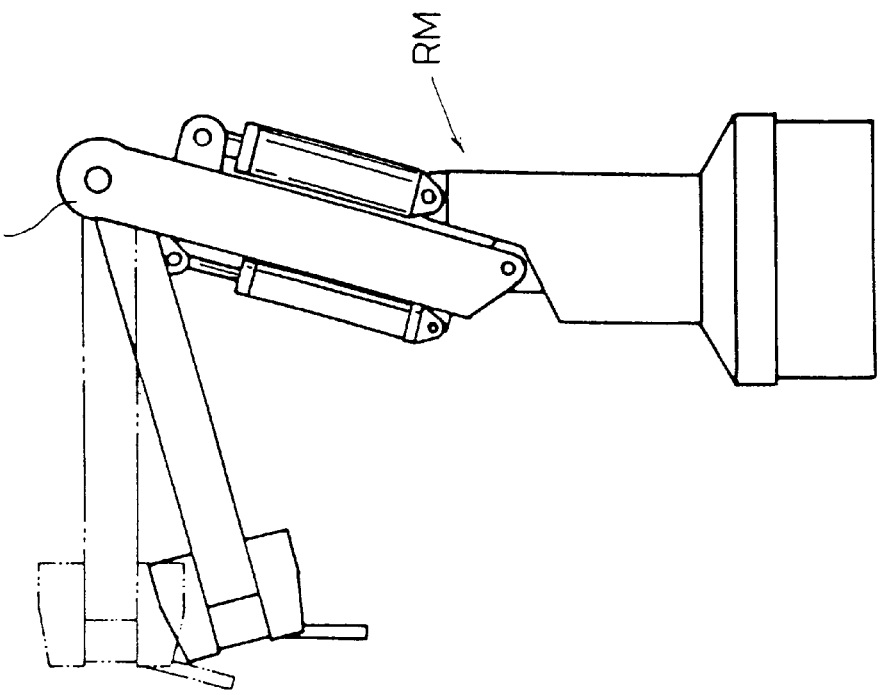
FIG. 8A illustrates a case in which a robot model is displayed at a magnification ratio of 200%.
Figure 8B:
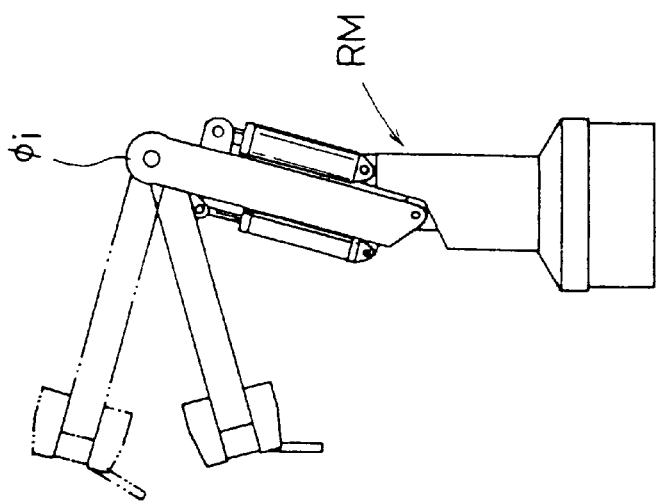
FIG. 8B illustrates a case in which the robot model is displayed in an ordinary size (magnification ratio of 100%)
Figure 8C:
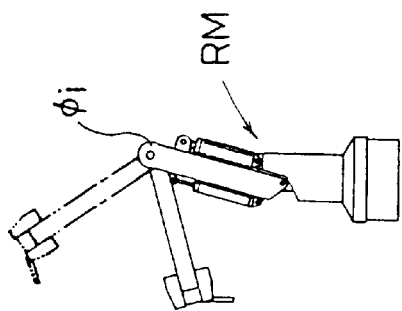
FIG. 8C illustrates a case in which the robot model is displayed at a magnification ratio of 50%.
Figure 9:
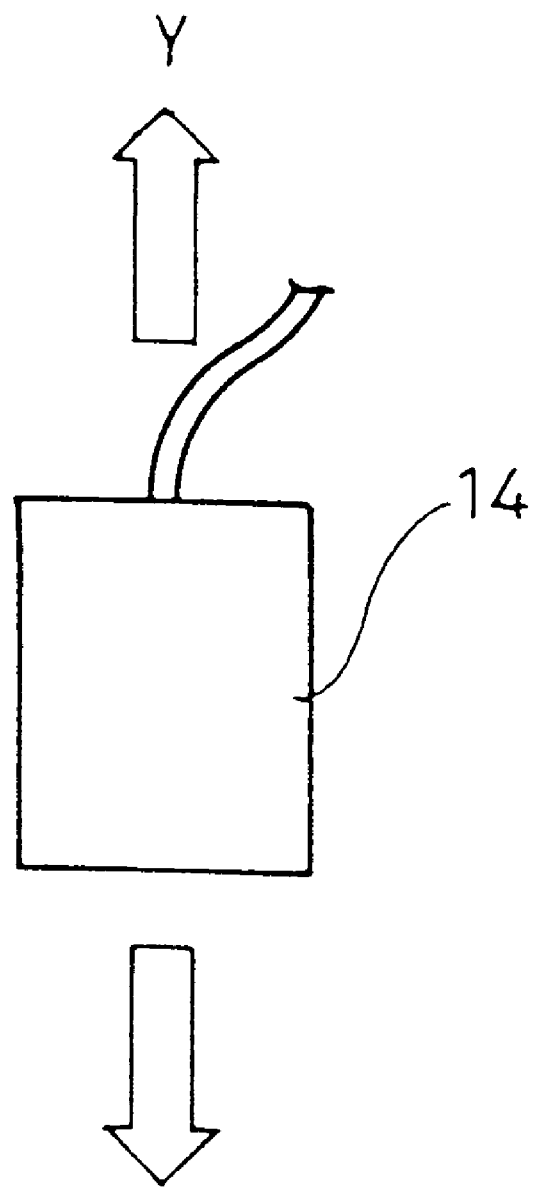
FIG. 9 illustrates a state in which a coordinate input device is moved in the Y direction.

For example, as shown in FIGS. 8A to 8C, it is assumed that a certain joint φi of the robot model RM displayed on the monitor 26 is allowed to make action. Assuming that the display shown in FIG. 8B has a normal display size (magnification ratio: 100%), the amount of action is 1 in the normal display size according to the characteristic curve shown in FIG. 7. The system is set such that the robot model RM makes action at a ratio of approximately 1:1 with respect to the action of the coordinate input device 14, for example, in the Y direction (see FIG. 9).

Similarly, when the magnification ratio is 200% (see FIG. 8A), the amount of action is 0.55. The system is set such that the robot model RM makes action at a ratio of approximately 1:0.55 with respect to the action of the coordinate input device 14 in the Y direction. On the contrary, when the magnification ratio is 50% (see FIG. 8C), the amount of action is 1.95. The system is set such that the robot model RM makes action at a ratio of approximately 1:1.95 with respect to the action of the coordinate input device 14 in the Y direction.

As described above, the larger the magnification ratio is, the smaller the amount of action is. Accordingly, the robot model RM, which is displayed with magnification, can be moved finely. Therefore, for example, it is easy to finely adjust the operation point (joint φi).

The information on the magnification/reduction characteristic curve may be allowed to have a common characteristic curve for the respective axes. However, as expected, finer adjustment can be performed when individual characteristic curves are prepared for the respective axes. Accordingly, in the embodiment of the present invention, in order to allow the respective axes to have individual characteristic curves one by one, the storage head address of each of the characteristic curve data is registered in the action attribute table 74 to successfully make easy access to the characteristic curve data corresponding to each of the axes.

As shown in FIG. 10, the display-processing means 70 comprises an operation command-reading means 76 for successively reading the operation command stored in the buffer 52, a display form information-reading means 78 for reading display form information such as the display orientation and the magnification ratio from the historical table 72, an action information-extracting means 80 for deducing the present operation point (for example, the first and second axes) from the read operation command and the display form information and deducing the direction of action concerning the operation point, an action attribute-reading means 82 for reading the action attribute corresponding to the operation command from the action attribute table 74 on the basis of the operation point extracted by the action information-extracting means 80 and the read display form information, and an action-processing means 84 for processing the action requested by the operation command on the basis of the direction of action extracted by the action information-extracting means 80 and the action attribute read by the action attribute-reading means 82.

Figure 11:
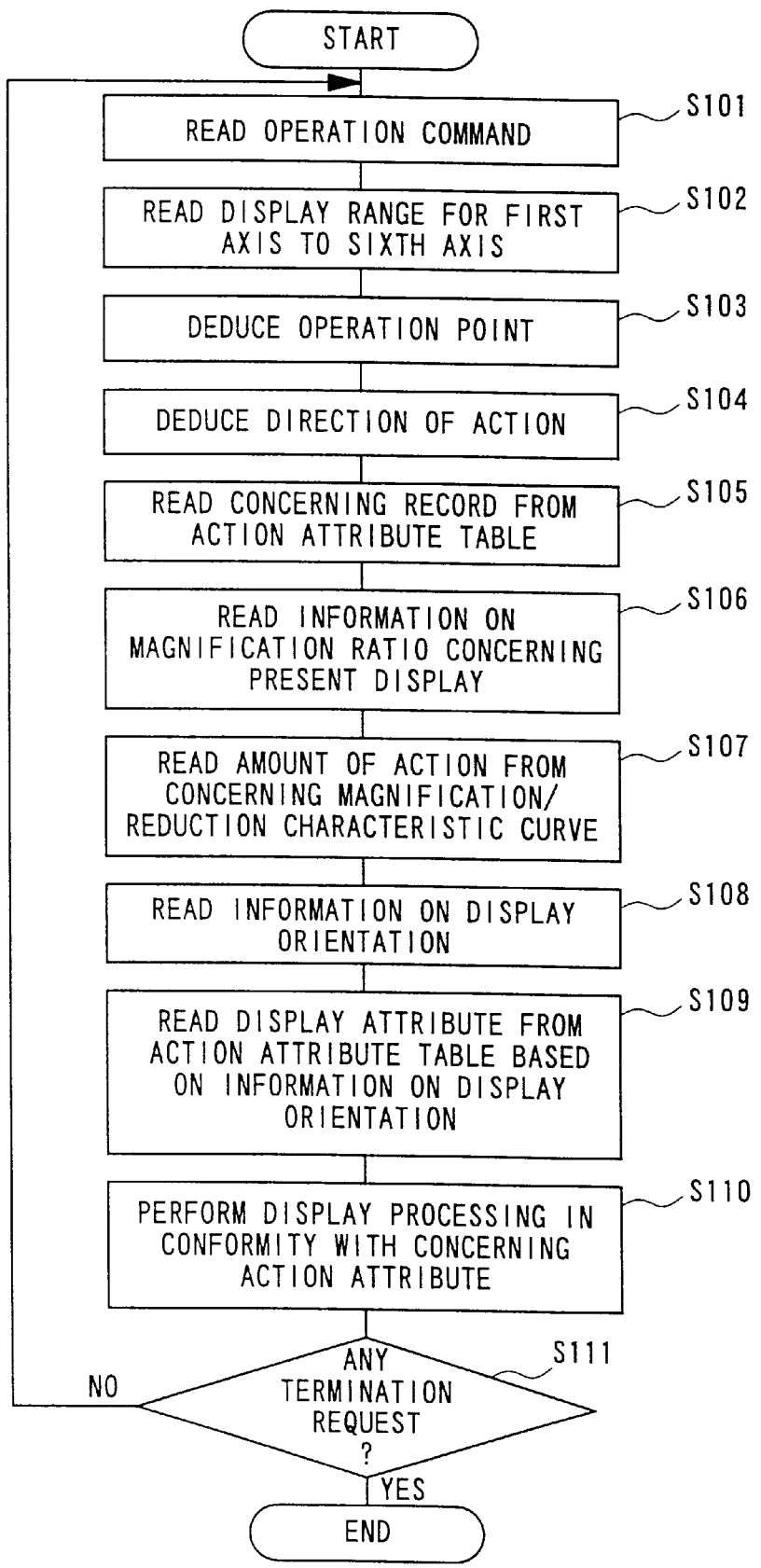
FIG. 11 shows a flow chart illustrating a processing action of the display-processing means.

Next, the processing action of the display-processing means 70 will be explained with reference to a flow chart shown in FIG. 11.

At first, in a step S101, the operation command-reading means 76 is used to read the operation command from the buffer 52.

Next, in a step S102, the display form information-reading means 78 is used to read the display range for the first axis to the sixth axis from the historical table 72.

Next, in a step S103, the action information-extracting means 80 is used to collate the coordinate data contained in the operation command with the display range for the first axis to the sixth axis so that the present operation point is deduced.

Next, in a step S104, the action information-extracting means 80 is used to deduce the direction of action from the operation command.

Next, in a step S105, the action attribute-reading means 82 is used to read the record corresponding to the operation point from the action attribute table 74 by using the deduced operation point as a record index.

Next, in a step S106, the display form information-reading means 78 is used to read, from the historical table 72, the information on the magnification ratio of the robot model displayed at present.

Next, in a step S107, the action attribute-reading means 82 is used to read the concerning characteristic curve data from the storage head address of the information on the magnification/reduction characteristic curve stored in the concerning record in the action attribute table 74. Further, the amount of action corresponding to the magnification ratio is read from the characteristic curve data.

Next, in a step S108, the display form information-reading means 78 is used to read the information on the orientation of the robot model RM displayed at present, from the historical table 72.

Next, in a step S109, the action attribute-reading means 82 is used to read the display attribute corresponding to the information on the orientation, from the concerning record in the action attribute table 74.

Next, in a step S110, the action-processing means 84 is used to allow the operation point of the robot model to make action in conformity with the direction of action deduced from the operation command, the read amount of action, and the display attribute information.

For example, as shown in FIG. 6, it is assumed that the display attributes, i.e., the front: "normal direction", the back: "opposite direction", and the side: "normal direction" are registered in the first record (record corresponding to the first axis) in the action attribute table 74. If the robot model RM on the monitor 26 is displayed at the front, and the operation command indicating, for example, rightward movement for the point of the first axis is inputted, then the robot model RM is moved in the normal direction, i.e., it is moved rightward.

If the robot model RM on the monitor 26 is displayed at the back, and the operation command indicating, for example, rightward movement for the point of the first axis is inputted, then the robot model RM is moved in the opposite direction, i.e., it is moved leftward. The same procedure is also used for the rotational action.

The larger the magnification ratio of the robot model RM is, the smaller the amount of action is, in relation to the action of the robot model RM. Therefore, it is easy to perform fine adjustment concerning the operation point. The smaller the magnification ratio of the robot model RM is, i.e., the larger the reduction ratio is, the larger the amount of action is. Therefore, it is possible to confirm the approximate action for the operation point at a glance.

In the next step S111, it is judged whether or not there is any termination request for the program. This judgement is made depending on whether or not there is any occurrence of termination request interrupt such as power source OFF.

If the termination request is not given in the step S111, the routine returns to the step S101 to perform the display processing for the next operation command. If the termination request is given, the display-processing program comes to an end.

As described above, the second function makes it possible to process the inputted operation command in conformity with the operation point and the display form (for example, with magnification, with reduction, as viewed from the front side, and as viewed from the back side) of the robot model RM.

That is, the robot model RM makes action in accordance with the angle of view at which the operator views the robot model RM. Therefore, it is unnecessary for the operator to convert the action of the robot model RM in the consciousness in conformity with the situation while recognizing the situation one by one. The action of the robot model RM in a variety of directions can be confirmed at a glance only by viewing the action of the robot model RM displayed on the monitor 26.

The amount of action is changed depending on the magnification ratio of the robot model RM displayed at present, on the basis of the information on the magnification/reduction characteristic curve as shown in FIG. 7. Therefore, when the robot model RM is magnified, the action is relatively slow, making it extremely easy for the operator to finely adjust the axis and set various parameters. On the other hand, when the robot model RM is reduced, the action is relatively fast. Accordingly, it is possible to quickly recognize the action of the axis, making it possible to rapidly confirm the result of adjustment.

Next, the third function will be explained with reference to FIGS. 12 to 14. The third function allows the robot model RM to make action concerning only a specified axis in accordance with the coordinate input device 14 in order to improve the operability of the off-line teaching.

The third function is achieved by executing a coordinate input-processing means (coordinate input-processing program) 90.

Figure 12:
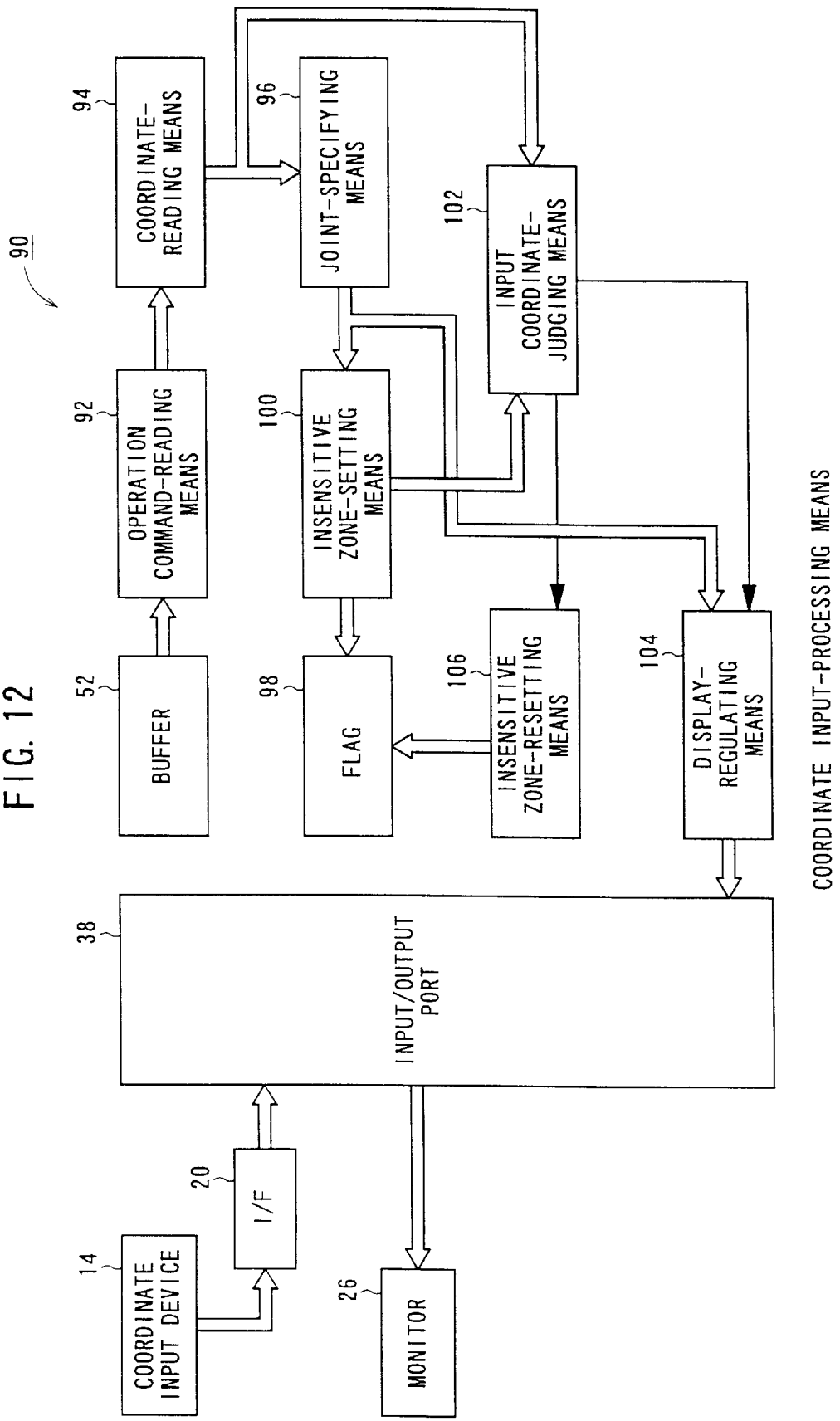
FIG. 12 shows a functional block diagram illustrating an arrangement of a coordinate input-processing means for achieving a third function.
Figure 13:
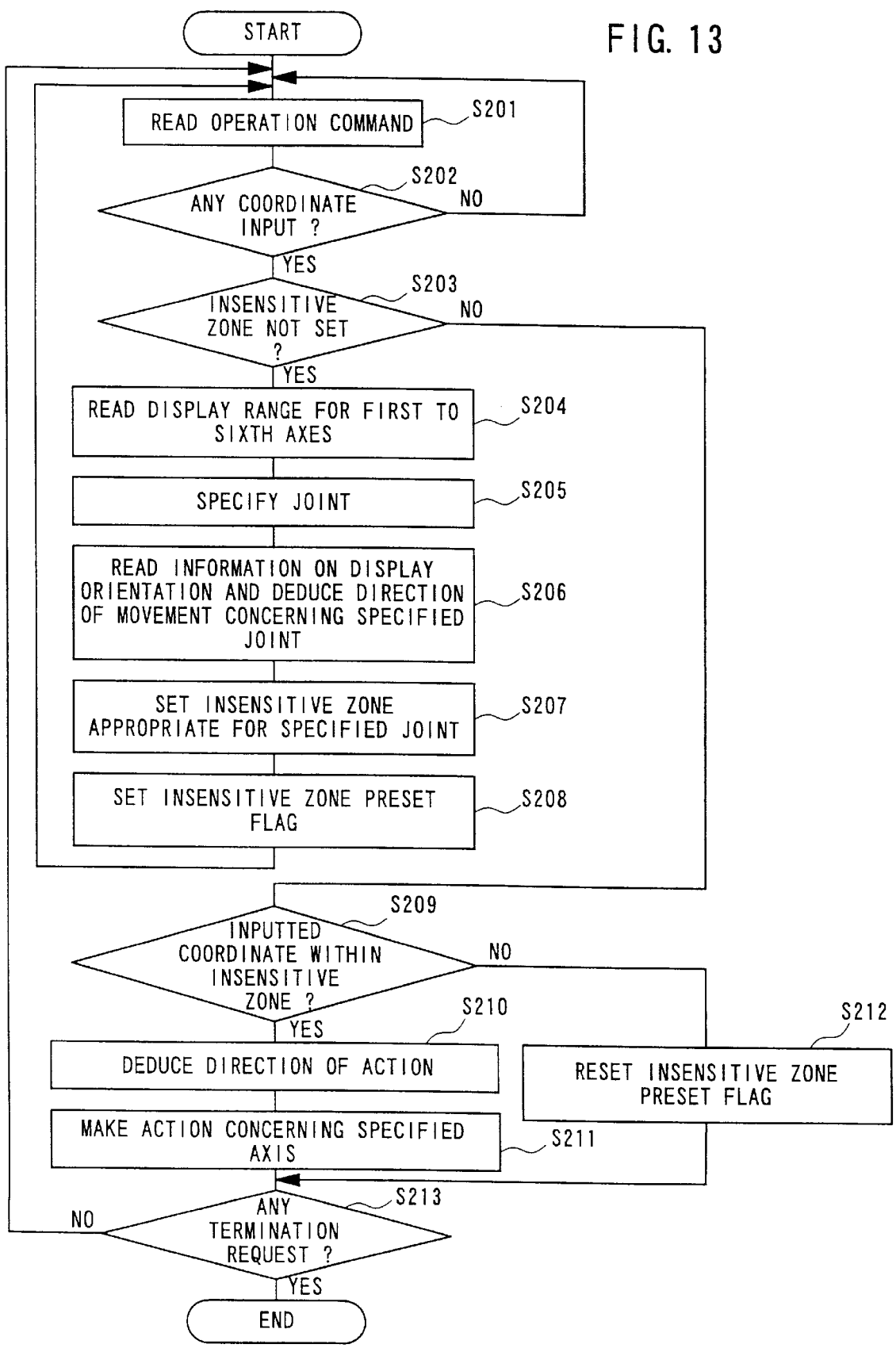
FIG. 13 shows a flow chart illustrating a processing action of the coordinate input-processing means.

As shown in FIG. 12, the coordinate input-processing means 90 comprises an operation command-reading means 92 for successively reading the operation command stored in the buffer 52, a coordinate-reading means 94 for reading the inputted coordinate data when the read operation command is a coordinate input, a joint-specifying means 96 for specifying the joint of the robot model RM on the basis of the coordinate data inputted at the initial stage, an insensitive zone-setting means 100 for setting the extending direction and the width of the insensitive zone on the basis of the specified joint and setting an insensitive zone preset flag 98, an input coordinate-judging means 102 for judging whether or not the inputted coordinate data is within a range of the preset insensitive zone, a display-regulating means 104 for permitting only movement of the joint specified by the joint-specifying means 96 if the result of judgement obtained by the input coordinate-judging means 102 is an affirmative judgement, and an insensitive zone-resetting means 106 for resetting the insensitive zone preset flag 98 if the result of judgement obtained by the input coordinate-judging means 102 is a negative judgement.

Next, the processing action of the coordinate input-processing means 90 will be explained with reference to a flow chart shown in FIG. 13.

At first, in a step S201, the operation command-reading means 92 is used to read the operation command from the buffer 52.

Next, it is judged whether or not the read operation command is a coordinate input from the coordinate input device 14 (step S202). If the read operation command is the coordinate input, the routine proceeds to the next step S203. If the read operation command is not the coordinate input, the routine returns to the step S201 to read the next operation command.

In the step S203, it is judged whether or not the insensitive zone is set. This judgement is made to determine whether the insensitive zone preset flag 98 is "0: not set" or "1: set". If the insensitive zone preset flag 98 is "0", the routine proceeds to the next step S204.

In the step S204, the joint-specifying means 96 is used to read the display range for the first axis to the sixth axis from the historical table 72 described above.

Next, in a step S205, the joint-specifying means 96 is used to collate the coordinate data contained in the operation command with the display range for the first axis to the sixth axis. Thus, the present joint is specified.

Next, in a step S206, the insensitive zone-setting means 100 is used to read the information on the display orientation of the robot model displayed at present, from the historical table 72. Further, the direction of movement of the specified joint is deduced on the basis of the display orientation.

Next, in a step S207, the insensitive zone-setting means 100 is used to set the insensitive zone suitable for the specified joint. Specifically, the direction, which is perpendicular to the deduced direction of movement, is regarded as the widthwise direction. The insensitive zone is set such that it has a width of an amount corresponding to several dots or several tens of dots as previously determined.

FIG. 14A shows an example in which an insensitive zone 110x is set when the direction of movement of the coordinate input device 14 is the X direction (see FIG. 14B), and an insensitive zone 110y is set when the direction of movement of the coordinate input device 14 is the Y direction (see FIG. 14B). FIG. 14A shows the two types insensitive zones 110x, 110y. However, actually, the respective insensitive zones 110x, 110y are set individually or singly.

Next, in a step 208, the insensitive zone-setting means 100 is used to set "1" for the insensitive zone preset flag 98. After that, the routine proceeds to the step S201 to read the next operation command.

If it is judged in the step S203 that the insensitive zone has been set, the routine proceeds to the next step S209. The input coordinate-judging means 102 is used to judge whether or not the read inputted coordinate is within the insensitive zone. If the inputted coordinate is within the insensitive zone, the routine proceeds to the next step S210. The display-regulating means 104 is used to deduce the direction of movement from the inputted coordinate.

Next, in a step S211, the display-regulating means 104 is used to make the display so that the specified joint is moved in a direction in which only the component of the direction of movement deduced in the step S206 is effective, of the direction of movement deduced in the step S210.

For example, it is assumed that a part of the robot is moved in the X direction by being actuated about the first axis, and the part of the robot is moved in the Y direction by being actuated about the second axis. Even when the indicating point of the coordinate input device 14 is moved along a circular arc within the insensitive zone 110x (see FIG. 14A) which extends in the X direction, then the part of the robot is not moved along a circular arc, but it is moved linearly only in the X direction.

On the other hand, if it is judged in the step S209 that the inputted coordinate does not exist in the insensitive zone, the routine proceeds to a step S212. The insensitive zone-resetting means 106 is used to set "0" for the insensitive zone preset flag 98 so that the insensitive zone preset flag 98 is reset.

The routine proceeds to the next step S213 at the stage at which the processing in the step S211 or in the step S212 is completed, and it is judged whether or not any program termination request is given. The judgement is made depending on whether or not there is any occurrence of termination request interrupt such as power source OFF.

If the termination request is not given in the step S213, the routine returns to the step S201 to perform the processing in the step S201 and the followings. If the termination request is given, the coordinate input-processing program 90 comes to an end.

As described above, the third function makes it possible to allow the robot model to move only the specified joint in accordance with the coordinate input device 14. For example, in order to confirm the action concerning, for example, the first axis to the third axis of the robot model having the six axes, it is assumed that the system is set such that the first to the third axis are effective for the action. In such a case, the present invention is extremely effective, for example, when it is intended to confirm the action only for the first axis.

Usually, when the coordinate input device 14 such as a mouse is operated by the human hand, the arm is moved rightward and leftward about the supporting point of the elbow. Therefore, the coordinate input device 14 is moved along a line depicted as a circular arc. In this case, for example, the second axis in the Y axis direction is also subjected to movement, for example, in addition to the first axis in the X axis direction, and it is impossible to allow the robot model to perform desired operation (operation to make the action only for the first axis). It is feared, for example, that such a situation obstructs the confirmation work for confirming the off-line teaching made for the robot model RM.

However, according to the third function, the robot model RM is allowed to move only the specified joint by using the coordinate input device 14. Therefore, the problem as described above is not caused. Thus, it is possible to improve the operability of the off-line teaching.

The respective first to third functions have been explained individually in relation to the off-line teaching apparatus 10 according to the embodiment of the present invention. However, the first to third functions may be arbitrarily combined.

For example, when the first function (operation command-processing means 50) is combined with the second function (display-processing means 70), the following procedure may be available. That is, the operation command-reading means 56 of the operation command-processing means 50 is used in common with the operation command-reading means 76 of the display-processing means 70. The display-processing means 70 is provided as a subroutine which is set in the step S8 of the operation command-processing means 50. The routine is allowed to return to the step S9 of the operation command-processing means 50 at the stage of completion of the step S110 of the display-processing means 70.

When the first function (operation command-processing means 50) is combined with the third function (coordinate input-processing means 90), the following procedure may be available. That is, the operation command-reading means 56 of the operation command-processing means 50 is used in common with the operation command-reading means 92 of the coordinate input-processing means 90, in the same manner as described above. The coordinate input-processing means 90 is provided as a subroutine which is set in the step S8 of the operation command-processing means 50. The routine is allowed to return to the step S9 of the operation command-processing means 50 at the stage of completion of the step S211 or S212 of the coordinate input-processing means 90.

Especially, in this case, as shown in FIG. 14A, it is easy to set the system such that the confirmation sound is generated if the inputted coordinate from the coordinate input device 14 exceeds, for example, the insensitive zone 110$x$ or 110$y$. Therefore, when the action of the specified joint is confirmed, the operator can be informed of the fact that the operation effected by the coordinate input device 14 exceeds the insensitive zone 110$x$ or 110$y$. Further, it is possible to effectively avoid the vain input when the amount of display data is large.

When the second function (display-processing means 70) is combined with the third function (coordinate input-processing means 90), the following procedure may be available. That is, the step S105 to the step S110 of the display-processing means 70 are provided as a subroutine to be used in place of the step S210 and the step S211 of the coordinate input-processing means 90. The routine is allowed to return to the step S213 of the coordinate input-processing means 90 at the stage of completion of the step S110 of the display-processing means 70.

When the first, second, and third functions (operation command-processing means 50, display-processing means 70, and coordinate input-processing means 90) are combined with each other, the following procedure may be available. That is, the operation command-reading means 56 of the operation command-processing means 50 is used in common with the operation command-reading means 92 of the coordinate input-processing means 90. The coordinate input-processing means 90 is provided as a subroutine which is used in place of the step S8 of the operation command-processing means 50. The routine is allowed to return to the step S9 of the operation command-processing means 50 at the stage of completion of the step S211 or S212 of the coordinate input-processing means 90. Further, the step S105 to the step S110 of the display-processing means 70 are provided as a subroutine which is used in place of the step S210 and the step S211 of the coordinate input-processing means 90. The routine is allowed to return to the step S213 of the coordinate input-processing means 90 at the stage of completion of the step S110 of the display-processing means 70. It is possible to further improve the operability by arbitrarily combining the first to third functions.

It is a matter of course that the off-line teaching apparatus according to the present invention is not limited to the embodiments described above, which may be embodied in other various forms without deviating from the gist or essential characteristics of the present invention.

As explained above, the off-line teaching apparatus according to the present invention lies in the off-line teaching apparatus for allowing the robot model displayed on the monitor to make action on the screen on the basis of the operation command supplied from the input device, wherein the sound for informing the input is generated at the point of time at which the input of the operation command from the input device is sensed.

Accordingly, the operator can be informed, in real time, of the fact that the system responds to the input of the operation command from the operator. Thus, the effect is achieved in that it is possible to improve the operability of the off-line teaching.

The off-line teaching apparatus according to the present invention lies in the off-line teaching apparatus for allowing the robot model displayed on the monitor to make action on the screen on the basis of the operation command supplied from the input device, wherein the operation command from the input device is interpreted depending on the display form and the operation point of the robot model to make the response.

Accordingly, it is possible to process the inputted operation command in conformity with the display form (for example, with magnification, with reduction, as viewed from the front side, and as viewed from the back side) of the robot model. Thus, the effect is achieved in that it is possible to improve the operability of the off-line teaching.

The off-line teaching apparatus according to the present invention lies in the off-line teaching apparatus for allowing the robot model displayed on the monitor to make action on the screen on the basis of the operation command supplied from the input device, wherein when the coordinate input device as one of the input device is operated along the direction of movement of one joint of the robot model, if the movement of the coordinate input device involves fluctuation in such a degree that the fluctuation is included in the previously set insensitive zone with its widthwise direction which is the direction perpendicular to the direction of movement, then only the movement based on the one joint of the robot model is permitted.

Accordingly, only the specified axis of the robot model can be allowed to make action by using the pointing device. Thus, the effect is achieved in that it is possible to improve the operability of the off-line teaching.

What is claimed is:

1. An off-line teaching apparatus, comprising:
   a coordinate input device;
   a monitor having a display screen, in which a robot model displayed on the display screen of said monitor performs a display action on said display screen, for indicating movement of said robot model on said display screen on the basis of an operation command supplied from said coordinate input device; and
   coordinate input processing means for processing inputs received through said coordinate input device, comprising an insensitive zone-setting means for setting a width of said insensitive zone perpendicular to a direction of movement of a specified joint of said robot model,
   wherein when said coordinate input device is operated along said direction of movement of said specified joint, if movement of said coordinate input device involves movement within said insensitive zone which is previously set, then only movement of said specified joint of said displayed robot model is permitted.

2. The off-line teaching apparatus according to claim 1, wherein said coordinate input processing means further comprises:
   a coordinate-reading means for reading inputted coordinate data from said coordinate input device with a predetermined time width;
   a joint-specifying means for specifying said joint of said robot model on the basis of coordinate data inputted at an initial stage;

a judging means for judging whether or not said inputted coordinate data is within a range of said preset insensitive zone; and a display-regulating means for permitting only movement of said joint specified by said joint-specifying means if a result of judgment obtained by said judging means is an affirmative judgment.

3. An offline teaching method for an offline teaching apparatus for effecting movement of a robot model on a display screen based on operational commands from at least one input device comprising the steps of:

operating a coordinate input device as one of said input devices along a direction of movement of one specified joint of said robot model;

presetting an insensitive zone as a width direction perpendicular to said direction of movement; and permitting movement only of said specified joint of said displayed robot model, if operating said coordinate input device causes movement of the robot model into the present insensitive zone.

* * * * *